Figure 1:
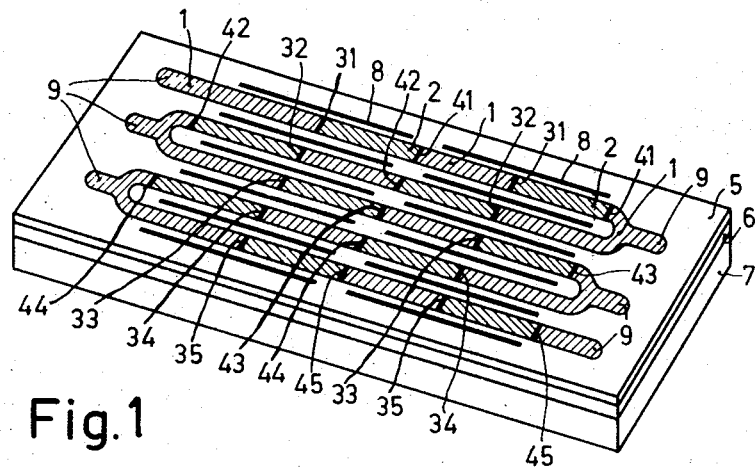

United States Patent [19]
Desvignes et al.

[11] 3,866,046
[45] Feb. 11, 1975

[54] DEVICE FOR DIGITAL DETECTION OF OPTICAL RADIATION

[75] Inventors: Francois Desvignes, Bourg la Reine; Raymond Hybois, Chevilly Larue; Dean Lebrun, Paris, all of France

[73] Assignee: U.S. Philips Corporation, New York, N.Y.

[22] Filed: Oct. 5, 1973

[21] Appl. No.: 403,927

[30] Foreign Application Priority Data
Oct. 9, 1972 France .............................. 72.35684

[52] U.S. Cl. ................................. 250/338, 250/349
[51] Int. Cl. .............................................. G01j 5/02
[58] Field of Search ..................... 250/338, 342, 349

[56] References Cited
UNITED STATES PATENTS

| | | |
|---|---|---|
| 2,392,873 | 1/1946 | Zahl .................................... 250/342 |
| 3,267,727 | 8/1966 | Benzinger ....................... 250/338 X |
| 3,287,976 | 11/1966 | Euser ............................. 250/338 X |
| 3,767,928 | 10/1973 | Bishop et al. ....................... 250/338 |

Primary Examiner—Archie R. Borchelt
Attorney, Agent, or Firm—Frank R. Trifari; Carl P. Steinhauser

[57] ABSTRACT

A device for detecting optical radiation comprising a plurality of series-connected thermocouples which form a pattern comprising a plurality of straight parallel rows which each consist of alternate elements made of two different materials so that alternate cold and hot junctions are produced. To obtain good thermal insulation between the hot junctions slits are formed between the said rows.

6 Claims, 2 Drawing Figures

PATENTED FEB 11 1975  3,866,046

DEVICE FOR DIGITAL DETECTION OF OPTICAL RADIATION

The invention relates to a device for detecting electromagnetic radiation comprising a plurality of series-connected thermo-couples which are arranged in a pattern which comprises a plurality of straight parallel rows each constituted by a series of alternate elements made of two different electrically conductive materials and disposed on a very thin insulating substrate which rests upon a support made of a material of high thermal conductivity. The electrically conductive materials are disposed so that the edges of two adjacent elements overlap so as to form junctions, alternate junctions being thermally insulated and constituting the hot junctions of a thermocouple. The junctions on either side of a hot junction, which serve as connections to the preceding termocouple and to the succeeding thermocouple, constitute cold junctions which are in thermal contact with the support through the very thin insulating substrate.

Such devices are used in particular for determining the direction of remote objects, such as heavenly bodies, which either emit or reflect electromagnetic radiation. In some cases in which the temperature of the object viewed is not very high this radiation is mainly produced in the infrared range of the spectrum.

For accurately determining the direction from which the radiation is received devices are required which consist of patterns of very small and highly sensitive infrared detectors. Among the various infrared detectors which may be used for this purpose thermocouples have the advantage that they need not be cooled and are capable of sensing non-modulated infrared signals also.

Such detectors are known, for example from French Pat. No. 2,064,584 which describes a thermoelectric radiation detector comprising a plurality of thermocouples. This detector has the disadvantage that the thermocouples are mounted on a sheet of a synthetic material, for example ethylene terephthalate, through which a heat distribution effect occurs, so that the accuracy of the device is adversely affected in that the optical information contained in the radiation is diffused.

Hence attempts have been made to separate the hot junctions as far as possible from the cold junctions. French Pat. No. 1,238,491, for example, describes a device for detecting thermal radiation in which the thermal conduction is reduced by the fact that the thermoelectric elements form discrete islands. For this purpose the thermocouples consist of thin wires of bismuth inserted in holes in an insulating plate one major surface of which is coated with a layer of antimony which serves as a cold junction. Manufacture of these devices requires a high degree of accuracy and is time consuming so that these detectors are expensive, while the mutual thermal insulation of the thermocouples is not fully satisfactory.

It is an object of the present invention to provide a detector which can readily be manufactured and has a high sensitivity and accuracy because of the excellent relative thermal insulation of adjacent thermocouples.

For this purpose the device according to the invention is characterized in that the substrate is provided with slits formed between and parallel to the straight parallel rows of the pattern, a slit being interposed between each two adjacent rows.

Preferably slits are formed on either side of each of the rows of the pattern (i.e., including the outermost rows) to ensure that all the rows are in the same situation.

Such a detection device may readily be manufactured by known techniques and moreover is very efficient.

The pattern which comprises at least a plurality of straight parallel lines may have the form of a meander or of a right-angled spiral, however, it may have any other form comprising a plurality of parallel straight lines, for example the form of a comb.

The slits may be formed in the insulating substrate by known means, for example by photolithographic techniques.

Alternatively, the slits may be formed by means of a laser beam or an electron beam; in the latter case the surface of the substrate must have a certain electric surface conductivity.

An embodiment of a device according to the invention is characterized in that beside each row of the pattern a plurality of aligned slits which are separated by uncut substrate portions are provided, the slits being equal in number to the hot junctions in each row of the pattern and the center of each slit being located near a hot junction. The presence of the uncut substrate portions increases the mechanical strength of the plate.

To enhance the thermal insulation of the hot junctions recesses are preferably formed in the support at least at the locations of the hot junctions. Thus, the hot junctions are disposed over the said recesses and between the center of the parallel slits in the substrate, so that they are highly insulated thermally. The thickness of the substrate must be so small that the ratio between this thickness and the distance between a hot junction and a cold junction is sufficiently small, for example less than 1/100.

Preferably electric connections are provided at all the ends or at a given number of ends of the straight rows of the pattern, so that each row or each group of rows of thermocouples provides an individual signal.

Figure 2:
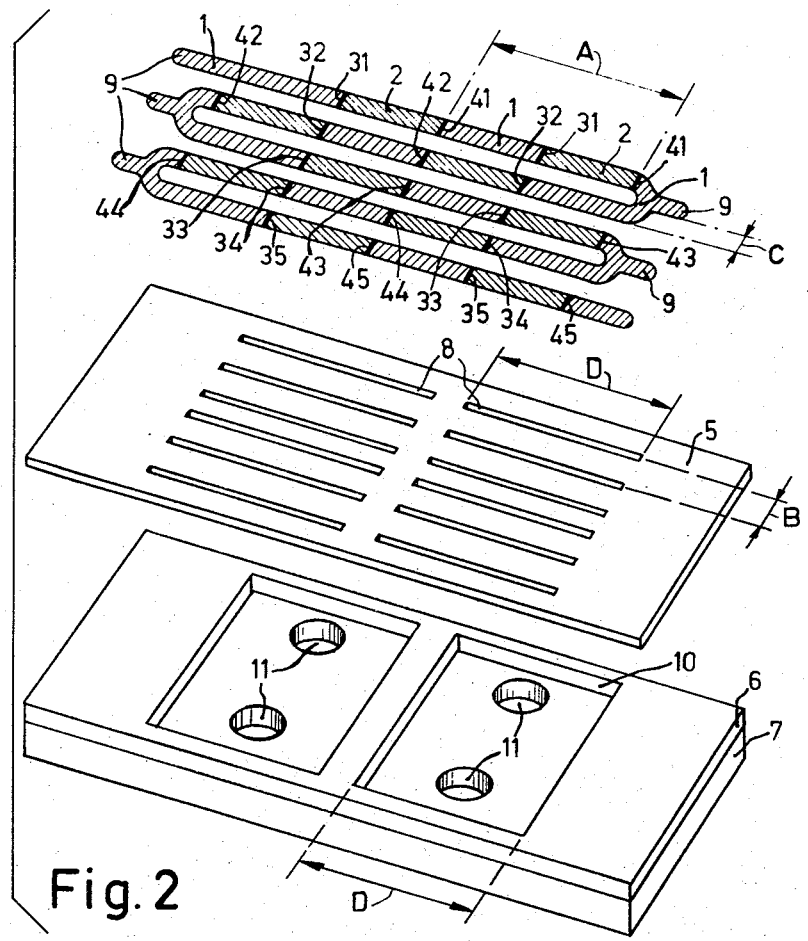

The invention will be described in greater detail in conjunction with the accompanying diagrammatic drawings in which FIG. 1 is a perspective view of a device according to the invention, and FIG. 2 is an exploded view thereof.

In The Figures corresponding elements are designated by the same numerals.

For clarity a simplified device will be described which has only two hot junctions in each straight-line section of a meander, the number of straight-line sections being restricted to five. The device shown in FIG. 1 comprises a series of alternate adjacent elements 1 and 2 made of two different electrically conducting materials. These materials are selected so that the elements 1 and 2 which are in contact with one another form thermocouples. Reference numerals 31 and 41 denote the hot and cold junctions respectively of the termocouples which constitute the first straight-line section of the meander, reference numerals 32 and 42 denote the hot and cold junctions respectively of the second straight-line section and reference numerals 33 and 43, 34 and 44, 35 and 45 similarly denote the hot and cold junctions respectively of the third, fourth and fifth straight-line sections.

The thermocouples lie on a thin insulating substrate 5 which in turn is secured to a support 6 made of a material of high thermal conductivity. The assembly may be cemented to a base 7 made of a material the coefficient of expansion of which is substantially equal to that of the substrate 5. The substrate 5 is formed with slits 8 which extend parallel to the straight-line sections of the meander both between all the straight-line sections and outside the outermost straight-line sections, so that all the rows of thermocouples are in the situation. In the embodiment shown electric connections 9 are provided at the ends of each row of thermocouples.

In FIG. 2 the said component parts of the device shown in FIG. 1, i.e., the meander comprising the elements 1 and 2, the substrate 5 and the combination of the support 6 and the base 7, are shown separately.

FIG. 2 shows that the support 6 is formed with two recesses 10 which are accessible via openings 11 in the base 7, enabling wax to be injected to increase the mechanical strength if need be. In addition, the openings 11 facilitate the withdrawal of air from the recesses 10 when the device is placed in a vacuum.

If the thermal conductivity of the base material is high enough, the support 6 may be dispensed with; in this case the recesses 10 are formed in the base 7 which then serves as a support also.

The device described may be manufactured as follows.

Manufacture starts from a flat foil of a material of high thermal conductivity, for example aluminum, the thickness of the foil being, for example, 0.1 mm. First the two major surfaces of this foil are oxidized by a suitable chemical or electrochemical treatment (for example by anodizing) to form a film of aluminum oxide having a thickness of about 0.3 $\mu$m on both major surfaces of the aluminum foil. This aluminum foil constitutes the support 6. The elements 1 and 2 are then mounted on one of the oxidized surfaces, hereinafter to be referred to as the front face, of the support 6. For this purpose nickel may be deposited by evaporation in a vacuum through a mask to form the elements 2, whereupon the resulting assembly has gold deposited on it by evaporation, the elements 1 being subsequently formed from this gold by a known photolithographic method.

After the provision of the elements 1 and 2 the second oxidized surface of the support 6 (the rear face) is coated with a resist.

The oxide film on the front face of the support 6 is then removed from the locations at which the slits 8 are to be formed by means of a cutting tool of suitable shape and size, the residual aluminum oxide forming the thin insulating substrate 5.

Then the front face of the support 6 in which the slits 8 have been formed and which carry the insulating substrate 5 and the elements 1 and 2 is protected by means of a lacquer, the resist is removed from the oxidized rear face of the support 6 and then the oxide film is removed by means of a curring tool from the rear face at the locations at which the recesses 10 are to be formed in the support 6. The support 6 then is etched at its rear face by means of a liquid which dissolves aluminum, for example orthophosphoric acid, the etching operation being continued until the layer of aluminum oxide which constitutes the substrate 5 has been exposed except at the locations protected by the residual aluminum oxide on the rear face. Then the resist is removed from the front face of the support 6 and connections 9 are made to the ends of the rows of thermocouples, for example by attaching gold wires by means of thermocompression.

Subsequently the aluminum foil is cemented to the base 7 which is made of a material having a coefficient of expansion about equal to that of the substrate 5.

Finally the sensitive part of the front face of the support 6 is entirely coated with a black absorbing layer which, if it is electrically conducting, must be provided with an insulating undercoating.

If desired, output electrodes may be provided in the base 7 and connected to the said connecting wires. These electrodes are not shown in the Figures.

The embodiment described of the device has only two hot junctions in each straight-line section of the meander and hence two recesses 10 formed in the support 6 each under one of the hot junctions. Owing to the recesses 10 and the slits 8 formed in the insulating substrate 5 excellent thermal insulation is obtained between a hot junction, for example the junction 33, and the hot junctions 32 and 34 situated one on either side. The thermal short-circuit produced by securing the substrate 5 to the support 6 at the location of the two adjacent cold junctions 43 also prevents thermal coupling.

The dimensions of a practical embodiment of a device according to the invention will now be given by way of example. The thermocouples constitutes orthogonal network the mesh width of which in one direction (A) is equal to the length of a thermocouple, i.e., equal to the distance between two junctions of the same nature, which length is about 800 $\mu$m in this embodiment. The mesh width in the other direction (B) is equal to the spacing between two parallel slits 8 and is about 80 $\mu$m. The width of each slit 8 is 20 $\mu$m and the width C of the elements 1 and 2 is 40 $\mu$m. The width D of the recesses 10 is equal to the length D of each slit 8 and is 700 $\mu$m. The materials of which the elements 1 and 2 consist are nickel and gold and their thickness is about 0.1 $\mu$m.

A black absorbing layer of gold of a thickness about 10 $\mu$m (not shown) is deposited from vapour in a pure nitrogen atmosphere by a known technique. Since this layer is electrically conducting, an insulating underlayer must be provided by cathode sputtering, the thickness of the sputtered layer (not shown) being 0.1 $\mu$m.

As was stated hereinbefore, the thickness of the aluminum foil which constitutes the support 6 is about 0.1 mm and the thickness of the oxide layer which constitutes the insulating substrate is about 0.3 $\mu$m.

The number of outputs and the number of thermocouples will in general be far greater than is shown in FIGS. 1 and 2. For example, on a support of 4 by 2 mm more than one hundred of series-connected thermocouples may be provided.

Instead of the materials mentioned the device described may be manufactured from various other materials. For example, the aluminum may be replaced by silicon, the gold-nickel couple may be replaced by bismuth-tellurium, bismuth-antimony or composite semiconductor materials of the II-VI type, for example the composite semiconductor materials Pb—Te, $Bi_2Te_3$, with various impurity concentrations, which enhances the sensitivity of the device. The insulating substrate 5 made be made of a thin foil of a synthetic material, for example ethylene terephthalate, or a thin layer of a substance capable of withstanding elevated temperatures, such as glass.

What is claimed is:

1. A device for detecting electromagnetic radiation comprising a support of thermally conductive material, a thin insulating substrate on said support, a plurality of series-connected thermocouples on said insulating substrate arranged in a pattern which comprises a plurality of straight parallel rows each constituted by a series of alternate elements made of two different electrically conductive materials, said electrically conductive materials being disposed so that the edges of adjacent elements overlap one another so as to form junctions, alternate junctions being thermally insulated and constituting the hot junctions of a thermocouple, while the junctions of either side of a hot junction, which serve as connections to the preceding thermocouple and to the succeeding thermocouple, constitute cold junctions which are in thermal contact with the said support through the very thin insulating substrate, said substrate having slits formed between and parallel to the straight parallel rows of the pattern, a slit being interposed between each two adjacent rows.

2. A device as claimed in claim 1, wherein the slits are formed on either side of each row of the pattern.

3. Device as claimed in claim 1 wherein beside each row of the pattern a plurality of aligned slits separated by uncut substrate portions are provided, the slits being equal in number to the number of hot junctions in each row of the pattern, the center of each slit being located near a hot junction.

4. A device as claimed in claim 1 wherein the support is recessed at least at the locations of the hot junctions.

5. A device as claimed in claim 1 wherein electric connections are made to each end of each row of thermocouples.

6. A device as claimed in claim 1 wherein electric connections are made to each end of a group of rows of thermocouples.

* * * * *